(12) United States Patent
Horita et al.

(10) Patent No.: US 12,338,089 B2
(45) Date of Patent: Jun. 24, 2025

(54) SHEET FEEDER, LAMINATOR, IMAGE FORMING APPARATUS, AND IMAGE FORMING SYSTEM

(71) Applicants: Hirofumi Horita, Kanagawa (JP); Akira Kunieda, Tokyo (JP); Yohsuke Haraguchi, Kanagawa (JP); Satoshi Kuno, Tokyo (JP); Koju Kawakami, Tokyo (JP); Yasunobu Kidoura, Kanagawa (JP); Ryohsuke Akaishi, Kanagawa (JP)

(72) Inventors: Hirofumi Horita, Kanagawa (JP); Akira Kunieda, Tokyo (JP); Yohsuke Haraguchi, Kanagawa (JP); Satoshi Kuno, Tokyo (JP); Koju Kawakami, Tokyo (JP); Yasunobu Kidoura, Kanagawa (JP); Ryohsuke Akaishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 107 days.

(21) Appl. No.: 18/164,196

(22) Filed: Feb. 3, 2023

(65) Prior Publication Data
US 2023/0264491 A1 Aug. 24, 2023

(30) Foreign Application Priority Data
Feb. 22, 2022 (JP) .................. 2022-025879

(51) Int. Cl.
*B65H 1/14* (2006.01)
*B32B 37/00* (2006.01)
(Continued)

(52) U.S. Cl.
CPC .......... *B65H 1/14* (2013.01); *B32B 37/0046* (2013.01); *B32B 39/00* (2013.01); *B65H 1/04* (2013.01);
(Continued)

(58) Field of Classification Search
CPC ..... B65H 1/14; B65H 1/18; B65H 2405/1111; B65H 2405/1112; B65H 2405/11152; B65H 2405/1117; B65H 2405/1124
See application file for complete search history.

(56) References Cited

U.S. PATENT DOCUMENTS 4,613,124 A * 9/1986 Lohrmann ............. B41J 13/103
271/170
5,009,410 A 4/1991 Fujii et al.
(Continued)

FOREIGN PATENT DOCUMENTS

| JP | 10-152234 | 6/1998 |
|---|---|---|
| JP | 2008-133103 | 6/2008 |

OTHER PUBLICATIONS

Extended European Search Report, dated Jul. 10, 2023, issued in corresponding European Patent Application No. 23154662.3.

*Primary Examiner* — Jeremy R Severson
(74) *Attorney, Agent, or Firm* — Harness, Dickey & Pierce, P.L.C.

(57) ABSTRACT

A sheet feeder includes a sheet stacker, a sheet feed roller, a separation roller pair, and a lifter. Sheets are conveyed and stacked on the sheet stacker. The sheet feed roller feeds the sheets. The separation roller pair separates the sheets fed by the sheet feed roller one by one. The lifter lifts and lowers the sheet stacker depending on a stack amount of the sheets. The sheet stacker includes a first stacking face, a second stacking face, and a bent portion integrally connecting the stacking faces such that the stacking faces form a specified angle. The sheet stacker stacks the sheets such that a center of gravity of the sheets is positioned above the first stacking face and integrally displaces the stacking faces when the lifter operates.

8 Claims, 6 Drawing Sheets

(51) Int. Cl.
*B32B 39/00* (2006.01)
*B65H 1/04* (2006.01)
*B65H 3/06* (2006.01)

(52) U.S. Cl.
CPC ........ *B65H 3/06* (2013.01); *B65H 2405/1111* (2013.01); *B65H 2405/1112* (2013.01); *B65H 2405/11152* (2013.01); *B65H 2405/1117* (2013.01); *B65H 2801/03* (2013.01); *B65H 2801/06* (2013.01)

(56) References Cited

U.S. PATENT DOCUMENTS

| | | | |
|---|---|---|---|
| 2021/0387467 A1* | 12/2021 | Asano | G06F 3/1217 |
| 2022/0033205 A1 | 2/2022 | Shibazaki et al. | |
| 2022/0041386 A1* | 2/2022 | Mitamura | B65H 1/14 |
| 2022/0291620 A1 | 9/2022 | Fujita et al. | |

* cited by examiner

SHEET FEEDER, LAMINATOR, IMAGE FORMING APPARATUS, AND IMAGE FORMING SYSTEM

CROSS-REFERENCE TO RELATED APPLICATION

This patent application is based on and claims priority pursuant to 35 U.S.C. § 119 (a) to Japanese Patent Application No. 2022-025879, filed on Feb. 22, 2022, in the Japan Patent Office, the entire disclosure of which is hereby incorporated by reference herein.

BACKGROUND

Technical Field

Embodiments of the present disclosure relate to a sheet feeder, a laminator, an image forming apparatus, and an image forming system.

Related Art

In the related art, in an image forming apparatus such as a copying machine, a printer, a facsimile machine, and a multifunction peripheral thereof, a sheet feeder is provided that separates and feeds a plurality of sheets stacked on a feed tray one by one toward, for example, an image forming device, an image reading device, or a sheet processing device. This sheet feeder employs a configuration in which the feed tray formed in a planar shape is used to facilitate setting of sheets to be fed, and a pair of side guides guides the sheets in a sheet width direction.

SUMMARY

In an embodiment of the present disclosure, there is provided a sheet feeder that includes a sheet stacker, a sheet feed roller, a separation roller pair, and a lifter. Sheets are conveyed and stacked on the sheet stacker. The sheet feed roller feeds the sheets. The separation roller pair separates the sheets fed by the sheet feed roller one by one. The lifter lifts and lowers the sheet stacker depending on a stack amount of the sheets. The sheet stacker includes a first stacking face opposite the sheet feed roller to support a downstream portion of the sheets in a conveyance direction, a second stacking face to support an upstream portion of the sheets in the conveyance direction, and a bent portion integrally connecting the first stacking face and the second stacking face such that the first stacking face and the second stacking face form a specified angle. The sheet stacker stacks the sheets such that a center of gravity of the sheets is positioned above the first stacking face and integrally displaces the first stacking face and the second stacking face when the lifter operates.

In another embodiment of the present disclosure, there is provided a laminator that includes the sheet feeder.

In still another embodiment of the present disclosure, there is provided an image forming apparatus that includes the sheet feeder or the laminator.

In still yet another embodiment of the present disclosure, there is provided an image forming system that includes the sheet feeder.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
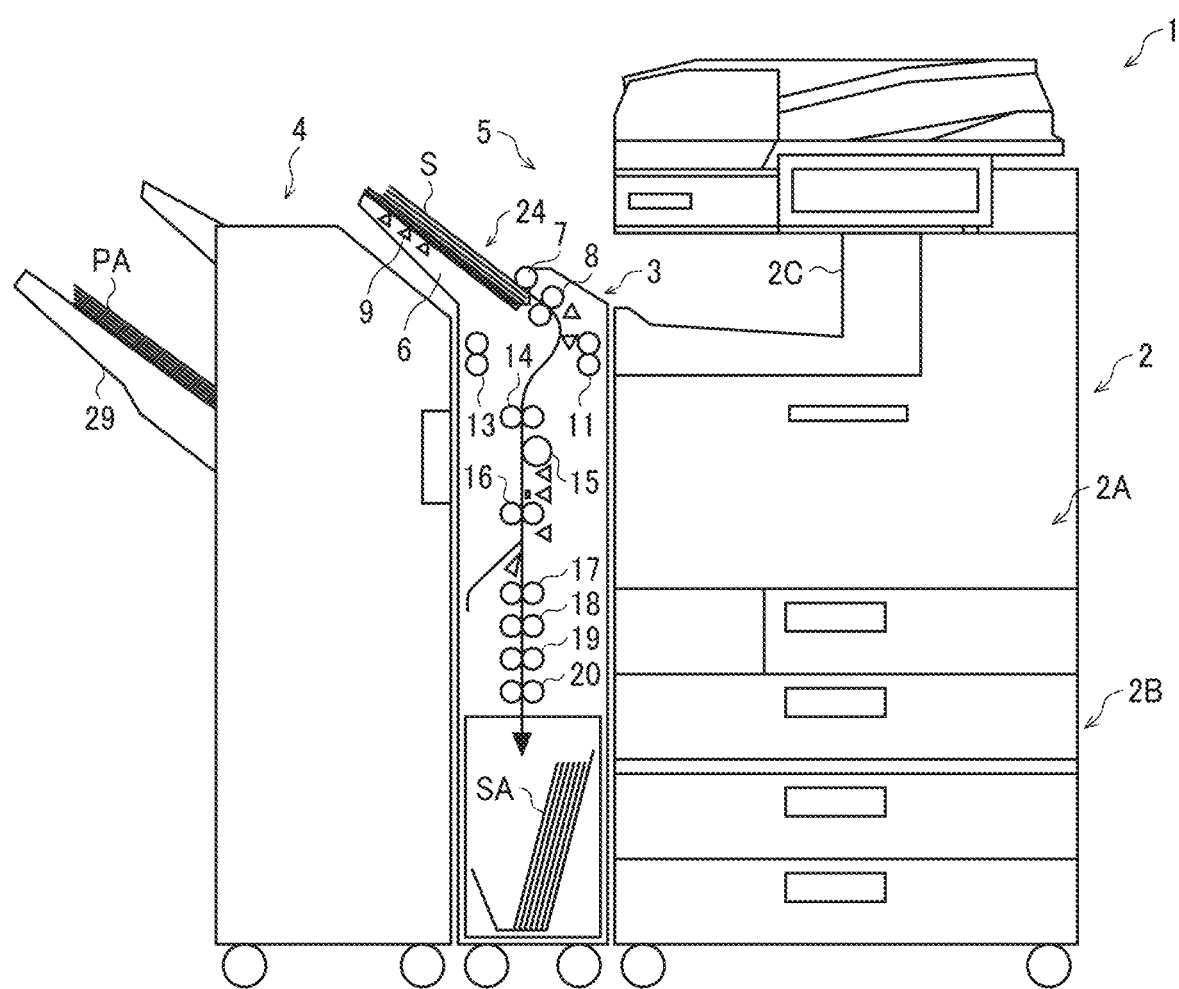
FIG. 1 is a front view of an image forming system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

FIG. 1 illustrates an image forming system to which an embodiment of the present disclosure can be applied. The image forming system 1 includes a multifunction peripheral 2 having, for example, a copy function, a print function, or a facsimile function, a laminator 3, and a post-processing apparatus 4. Among these components, the multifunction peripheral 2 constitutes an image forming apparatus as a single unit. An image forming apparatus 5 is also constituted by a component having the multifunction peripheral 2 and the laminator 3.

The multifunction peripheral 2 includes an image forming device 2A having a known configuration that forms images on transfer sheets as recording medium, and a sheet feeder 2B that stores the transfer sheets on which images are formed and feeds the transfer sheets to the image forming device 2A. The transfer sheets stored in the sheet feeder 2B and used for image formation also include inner sheets used when laminate processing is performed in the laminator 3 and sealed between lamination sheets. The transfer sheet on which an image has been formed in the multifunction peripheral 2 is ejected onto a relay device 2C that also serves as an output tray. The transfer sheet ejected onto the relay device 2C can be fed to the laminator 3 as it is. Accordingly, since image formation can be performed on the inner sheets by the multifunction peripheral 2, the image forming apparatus 5 can automatically perform a series of processes including feeding of the lamination sheet, separation, inner sheet preparation, inner sheet insertion, and laminating. A description of the post-processing apparatus 4 is given below.

Figure 2:
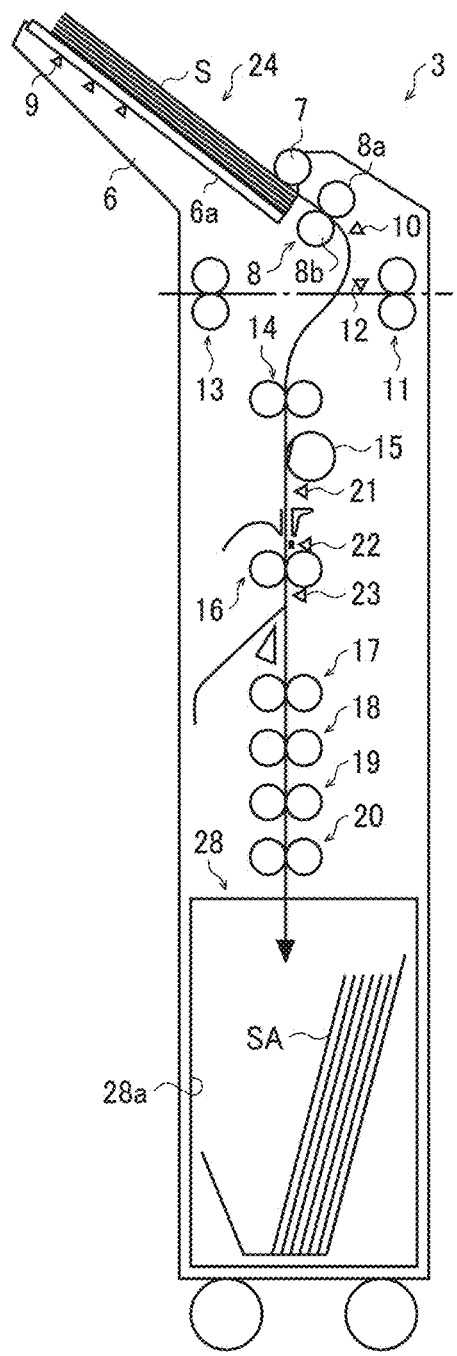
FIG. 2 is a schematic view of a laminator according to an embodiment of the present disclosure.

The laminator 3 illustrated in FIGS. 1 and 2 is an apparatus that performs the laminate processing in which an inner sheet (i.e., paper or photograph) is inserted into a lamination sheet which is a two-ply sheet in which two stacked sheets are joined at only one side, applies heat and pressure, and joins the lamination sheet holding the inner sheet. In the following description, expression of "joining the lamination sheet and the inner sheet" is used. The lamination sheet S used as a sheet includes, for example, a sheet in which one side is permeable such as a polyester sheet and the other side is permeable or impermeable, or a lamination film. The inner sheets include, for example, plain paper, thick paper, postcards, envelopes, thin paper, coated paper, tracing paper, or overhead projector (OHP) transparencies.

The laminator 3 includes a sheet feed tray 6 on which the lamination sheets S are stacked, a sheet feed roller 7 that feeds the lamination sheets S on the sheet feed tray 6, and a separation roller pair 8 that separates the lamination sheets S fed by the sheet feed roller 7 one by one. The sheet feed tray 6 is provided with a plurality of sheet size detection sensors 9 that detect the size of the stacked lamination sheet S. The sheet feed tray 6 includes a sheet tray 6a as a liftable sheet stacker on which the lamination sheets S are stacked. The sheet tray 6a is lifted and lowered by a lifter 30 described below so that the uppermost lamination sheet S is pressed against the sheet feed roller 7 with a specified pressing force. The separation roller pair 8 includes a feed roller 8a which is driven to rotate in conjunction with the sheet feed roller 7 and a separate roller 8b which is stopped or rotatable in a direction opposite to a sheet feed direction (see FIG. 2). The feed roller 8a and the separate roller 8b have high frictional resistance members on their surfaces. When two or more lamination sheets S are fed, only one sheet is fed due to the difference between frictional resistance between the sheets and frictional resistance between the sheet and the rollers.

A sheet conveyance detection sensor 10 that detects conveyance of the lamination sheet S is disposed downstream from the separation roller pair 8 in the sheet conveyance direction. An entrance roller pair 11 that receives a transfer sheet sent from the multifunction peripheral 2 and a sheet conveyance detection sensor 12 that detects the conveyed transfer sheet are disposed below the sheet conveyance detection sensor 10. An ejection roller pair 13 that sends out the transfer sheet sent from the multifunction peripheral 2 to the post-processing apparatus 4 is disposed on the left side of the entrance roller pair 11 when the laminate processing is not performed in the laminator 3.

A first conveying roller pair 14, a winding roller 15, a second conveying roller pair 16, a third conveying roller pair 17, a heating roller pair 18, a fourth conveying roller pair 19, or an ejection roller pair 20 are disposed downstream from the separation roller pair 8 in the sheet conveyance direction. A sheet position detection sensor 21 that detects the positions of the lamination sheet S and an inner sheet P as the transfer sheet is disposed downstream from the winding roller 15 in the sheet conveyance direction. A sheet condition detection sensor 22 that detects the condition of the lamination sheet S is disposed downstream from the sheet position detection sensor 21 in the sheet conveyance direction. A sheet position detection sensor 23 that detects the positions of the lamination sheet S and the inner sheet P is disposed downstream from the second conveying roller pair 16 in the sheet conveyance direction. Among the above-described configurations, the sheet feed tray 6, the sheet feed roller 7, the separation roller pair 8, and the lifter 30 constitute at least part of a sheet feeder 24.

In FIGS. 1 and 2, each of the first conveying roller pair 14 and the second conveying roller pair 16 includes a drive roller and a driven roller which are pressed against each other. The drive roller is driven to rotate by a driver to nip and convey the lamination sheet S and the inner sheet P. The first conveying roller pair 14 is rotatable only in the conveyance direction in which the sheet is fed downward in FIG. 2. The second conveying roller pair 16 is rotatable in both the conveyance direction and a reverse conveyance direction opposite to the conveyance direction.

Figure 3:
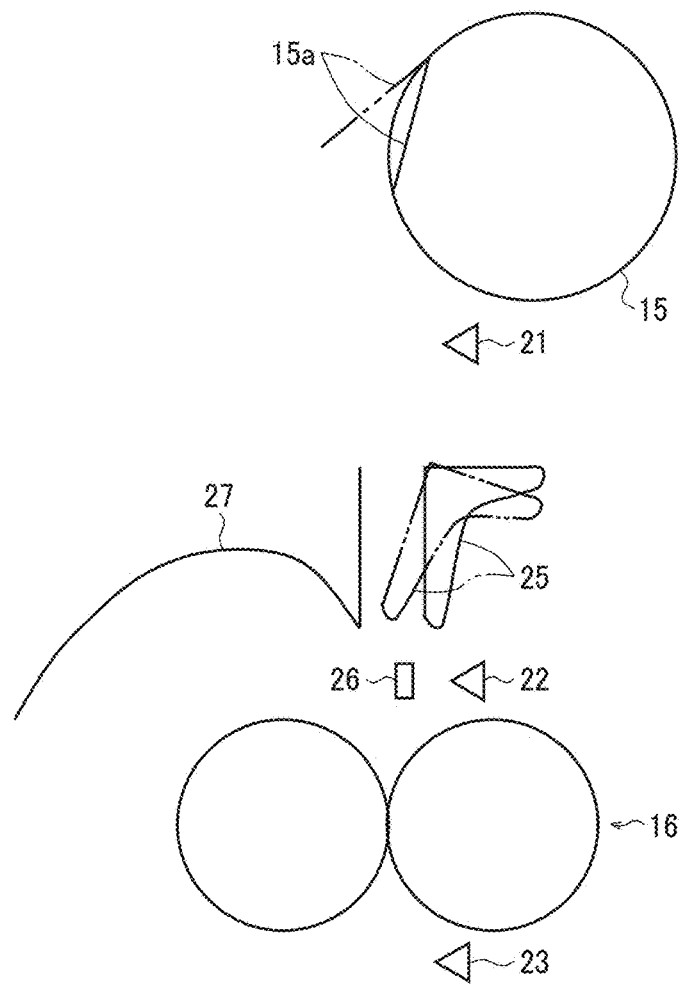
FIG. 3 is a schematic view of a winding roller, a switching claw, and a separation claw used in the laminator.

As illustrated in FIG. 3, the winding roller 15, a switching claw 25, a separation claw 26, are disposed between the first conveying roller pair 14 and the second conveying roller pair 16. The winding roller 15 is driven to rotate by a driver and is rotatable in both the conveyance direction and the reverse conveyance direction similarly to the second conveying roller pair 16. The winding roller 15 has a gripper 15a that holds the lamination sheet S on its outer circumferential surface. The gripper 15a is displaced by opening and closing member to selectively occupy a closed position indicated by a solid line and an open position indicated by a long dashed double-dotted line in FIG. 3. An end of the lamination sheet S can be gripped at the closed position. The gripped end of the lamination sheet S is released at the open position. When the end of the lamination sheet S is gripped by the gripper 15a, the end position of the lamination sheet S is detected by the sheet position detection sensor 21.

The switching claw 25 is disposed downstream from the sheet position detection sensor 21 in the sheet conveyance direction. The switching claw 25 is displaced by a displacer and selectively occupies a first position indicated by a solid line and a second position indicated by a long dashed double-dotted line in FIG. 3. When the switching claw 25 occupies the first position, the leading end of the lamination sheet S conveyed between the winding roller 15 and the second conveying roller pair 16 can pass in any of the conveyance direction and the reverse conveyance direction. When the switching claw 25 occupies the second position, the leading end of the lamination sheet S in the conveyance direction (i.e., the leading end located upstream from the switching claw 25 in the conveyance direction) passes through the switching claw 25 and can be conveyed downstream from the switching claw 25. When the switching claw 25 occupies the second position, the leading end of the lamination sheet S in the reverse conveyance direction (i.e., the leading end located downstream from the switching claw 25 in the conveyance direction) is prevented from passing through the leading end of the switching claw 25 and from moving toward an upstream side in the conveyance direction. At this time, the leading end of the lamination sheet S in the reverse conveyance direction is separated into two sheets by the separation claw 26. One of the two sheets is guided by the switching claw 25 and conveyed to the right side in FIG. 3. The other leading end of the separated lamination sheet S in the reverse conveyance direction is guided by a guide plate 27 fixed to the apparatus body of the laminator 3 and conveyed to the left side in FIG. 3.

A pair of separation claws 26 are disposed to be movable in the width direction of the lamination sheet S on a downstream side of the switching claw 25 in the sheet conveyance direction. The separation claw 26 is selectively positioned at a standby position and a separation position by a mover. The separation claw 26 is formed in a shape in which the leading ends that inner ends facing each other are pointed, and is formed so that each leading end can be inserted between each overlapped sheet of the lamination sheet S when the separation claw 26 occupies the separation position. When the separation claw 26 occupies the standby position, each leading end is retreated to the outside of the conveyance region of the lamination sheet S. Thus, the separation claw 26 does not disturb the conveyance of the lamination sheet S. The sheet condition detection sensor 22 is disposed at a position corresponding to the leading end of the lamination sheet S in the conveyance direction, into which the separation claw 26 is inserted in the conveyance direction.

In FIGS. 1 and 2, each of the third conveying roller pair 17, the fourth conveying roller pair 19, and the ejection roller pair 20 includes a drive roller and a driven roller that are pressed against each other. Thus, the drive roller is driven to rotate by a driver to nip and convey the sheets. The third conveying roller pair 17, the fourth conveying roller pair 19, and the ejection roller pair 20 are rotatable only in the conveyance direction. The heating roller pair 18 includes a heating roller that has a heater therein and is driven to rotate and a pressure roller that is pressed against the heating roller and is driven to rotate. The heating roller pair 18 applies heat and pressure to the lamination sheet S in which the inner sheet P is inserted between the two sheets of the lamination sheet S to join the lamination sheet S with the inner sheet P. A storage tray 28 is disposed downstream from the ejection roller pair 20 in the sheet conveyance direction, to store a finished product lamination sheet SA joined and finished after the insertion of the inner sheet P. The storage tray 28 stores the finished product lamination sheet SA, which has been vertically conveyed downward in the apparatus body of the laminator 3, in a vertical state. The storage tray 28 has an opening portion 28a on the front face of the apparatus body so that the stored product lamination sheet SA can be easily taken out.

Next, a description is given of a series of operations performed in the laminator 3, with reference to FIG. 4. The series of operations performed in the laminator 3 indicates the operations of separating the lamination sheet S, inserting the inner sheet P into the lamination sheet S, and joining the lamination sheet S and the inner sheet P. The configurations of the winding roller 15, the switching claw 25, and the separation claw 26 described above and the operation described below are disclosed in detail in a known technology by the same applicant of the present disclosure. As illustrated in FIG. 2, the lamination sheets S on the sheet feed tray 6 are set such that one side having a joined portion where two sheets are joined is positioned downstream from the sheet feed tray 6 in the sheet conveyance direction. Thus, a plurality of lamination sheets S are stacked on the sheet feed tray 6. When the setting of the lamination sheet S is confirmed and a start key is turned on, the laminator 3 operates the sheet feed roller 7 and the separation roller pair 8 to feed one lamination sheet S toward the first conveying roller pair 14.

Figure 4A:
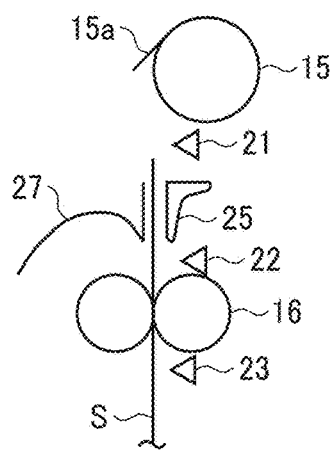
FIGS. 4A to 4H are diagrams illustrating a series of steps for a lamination sheet in the laminator.

The first conveying roller pair 14, which has received the lamination sheet S from the separation roller pair 8, conveys the lamination sheet S further downstream from the first conveying roller pair 14. The leading end in the conveyance direction of the conveyed lamination sheet S is one side having a joined portion where two sheets are joined. The trailing end in the conveyance direction is the other side having an overlaid portion where two sheets are overlaid. The laminator 3 temporarily stops the conveyance of the lamination sheet S at the time when the trailing end of the lamination sheet S in the conveyance direction passes through the winding roller 15 and the detection of the lamination sheet S by the sheet position detection sensor 21 is halted. Thereafter, the laminator 3 operates the opening and closing member to displace the gripper 15a from the closed position to the open position as illustrated in FIG. 4A.

Figure 4B:
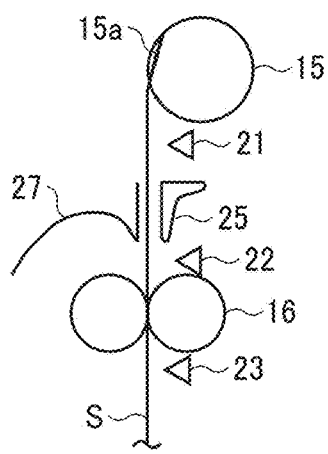

Next, the laminator 3 rotates the second conveying roller pair 16 in reverse to convey the lamination sheet S in reverse vertically upward. When the laminator 3 recognizes, based on a signal from the sheet position detection sensor 21, that the trailing end (leading end in the reverse conveyance direction) of the lamination sheet S to be conveyed in reverse has been conveyed to a position where it can be gripped by the gripper 15a occupying the open position, the reverse conveyance of the lamination sheet S is stopped. Thereafter, the laminator 3 operates the opening and closing member to displace the gripper 15a from the open position to the closed position as illustrated in FIG. 4B. Thus, the laminator 3 holds the lamination sheet S on the outer circumferential surface of the winding roller 15.

Figure 4C:
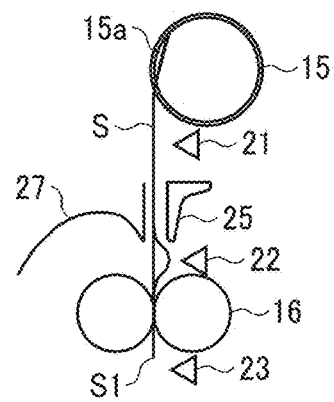

Next, the laminator 3 drives to rotate the winding roller 15 in a clockwise direction in FIG. 3 and winds the lamination sheet S on an outer circumferential surface of the winding roller 15. When the lamination sheet S is wound around the outer circumferential surface of the winding roller 15 by about one turn, the sheet positioned on the inner side of the lamination sheet S is left over against the sheet positioned on the outer side of the lamination sheet S due to a difference in circumferential length when the two overlaid sheets are wound. Thus, a slack is generated in a joined portion that is one side of the lamination sheet S. As a result, a space is generated between the sheets as illustrated in FIG. 4C. The generated space is detected by the sheet condition detection sensor 22. A conveyance control of the lamination sheet S in a case where the lamination sheet S is wound around the winding roller 15 is performed based on the sheet position detection sensor 23. In a state illustrated in FIG. 4C, the one side S1 of the lamination sheet S on which the joined portion is disposed is located downstream from the sheet position detection sensor 23 in the reverse conveyance direction.

Figure 4D:
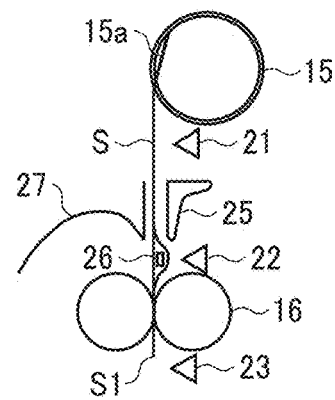
Figure 4E:
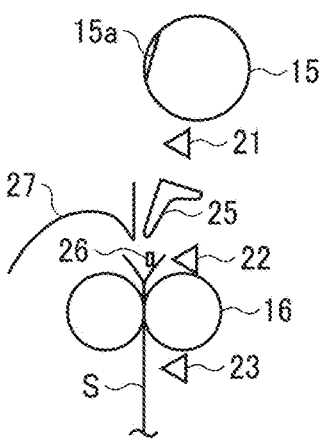
Figure 4F:
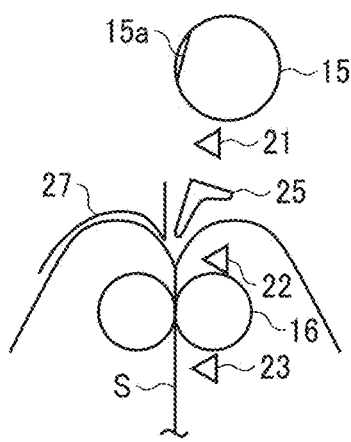
Figure 4G:
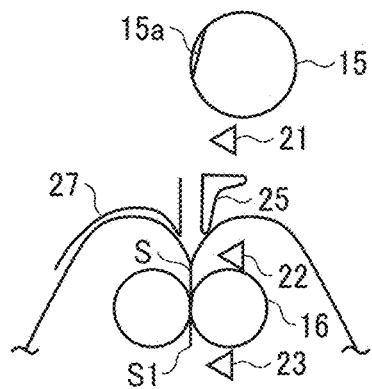
Figure 4H:
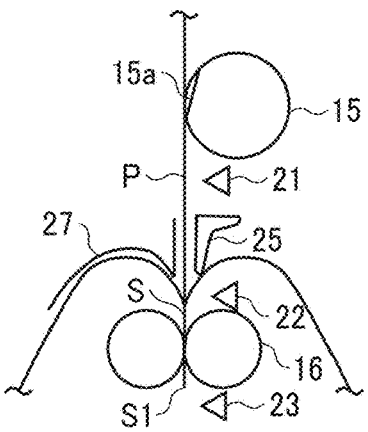

Next, the laminator 3 operates the mover to move the separation claw 26 from the standby position to the separation position, inserts the separation claw 26 into the space generated between the sheets from both sides in the width direction of the lamination sheet S, and reliably maintains the generated space by the separation claws 26 as illustrated in FIG. 4D. Thereafter, the winding roller 15 is rotated in the counterclockwise direction in FIG. 3 in a state where the separation claw 26 is inserted between the sheets. The second conveying roller pair 16 is rotated in the normal direction to move the space in which each sheet is separated to the trailing end of the lamination sheet S in the conveyance direction. In the middle of the operation, when the lamination sheet S is moved by a specified amount, the gripper 15a is displaced to the open position to release the trailing end in the conveyance direction of the lamination sheet S held by the winding roller 15. Thereafter, when the trailing end of the lamination sheet S in the conveyance direction has reached the position corresponding to the separation claw 26, the conveyance of the lamination sheet S is stopped and the displacer is operated. Thus, the switching claw 25 is displaced from the first position to the second position as illustrated in FIG. 4E.

Next, the laminator 3 rotates the second conveying roller pair 16 in reverse to convey the lamination sheet S in reverse. At this time, one of the two sheets separated from each other by the separation claw 26 located on the right side in FIG. 4E is guided rightward by the switching claw 25 located at the second position. The other sheet of the two sheets located on the left side in FIG. 4E is guided leftward by the guide plate 27. During this operation, when the two separated sheets are guided in the left and right directions by the switching claw 25 and the guide plate 27, respectively, the mover is operated to move the separation claw 26 from the separation position to the standby position. Thus, the sheets are brought to the state illustrated in FIG. 4F. When the lamination sheet S is further conveyed in the reverse direction, the two separated sheets are entirely separated from each other. When one side S1 of the lamination sheet S has reached a specified position, the reverse conveyance of the lamination sheet S is temporarily stopped. At this time, the joined portion of the lamination sheet S is nipped by the second conveying roller pair 16, and the overlaid portion is largely opened to the left and right. Thereafter, the displacer is operated to displace the switching claw 25 from the second position to the first position. Thus, the sheets are brought to the state illustrated in FIG. 4G.

Next, the inner sheet P is fed from the multifunction peripheral 2 via the relay device 2C. The fed inner sheet P is taken into the inside of the apparatus body of the laminator 3 via the entrance roller pair 11, is detected by the sheet conveyance detection sensor 12, and is guided by a switching claw to be delivered to the first conveying roller pair 14. Thereafter, the inner sheet P is further conveyed downward by the first conveying roller pair 14, and the leading end of the inner sheet P is inserted into the overlaid portion of the lamination sheet S that is widely opened to the left and right. Thus, the sheets are brought to the state illustrated in FIG. 4H. Next, the laminator 3 conveys vertically downward the lamination sheet S into which the inner sheet P is inserted. The sheets are overlaid again to close the opening. The lamination sheet S into which the inner sheet P is inserted is further conveyed downward by the third conveying roller pair 17. Thus, the lamination sheet S is sent to the heating roller pair 18.

The inner sheet P and the lamination sheet S sent to the heating roller pair 18 are cooled when passing through the fourth conveying roller pair 19 and the ejection roller pair 20 after the lamination sheet S and the inner sheet P are joined by the action of heat and pressure. The finished product lamination sheet SA that has been cooled and completed is ejected to a storage tray 28 in an upright state by the ejection roller pair 20. As described above, since the finished product lamination sheet SA pressed after passing through the heating roller pair 18 is ejected vertically downward, the finished product lamination sheet SA can be stored in the storage tray 28 while being prevented from being curved by an external force. In this configuration, since the finished product lamination sheet SA is ejected vertically downward, gravity and external force that deform the finished product lamination sheet SA do not act on the finished product lamination sheet SA. Since the finished product lamination sheet SA is sufficiently cooled by arrival at the storage tray 28, deformation of the finished product lamination sheet SA is restricted even if the stacking surface of the storage tray 28 is inclined.

Next, a description is given of the post-processing apparatus 4. In a case of an image forming operation in which the laminate processing is not performed, a transfer sheet PA that is ejected from the multifunction peripheral 2 and is not used as the inner sheet P is received by the entrance roller pair 11 of the laminator 3. Thereafter, the transfer sheet PA is conveyed in the horizontal direction and is conveyed to the post-processing apparatus 4 coupled downstream from the laminator 3 by the ejection roller pair 13. In the post-processing apparatus 4, post processing such as staple processing and sort processing can be performed on the transfer sheet PA. The transfer sheets PA is stacked on an output tray 29 of the post-processing apparatus 4.

In the image forming apparatus 5 including the above-described laminator 3, a series of the laminate processing operations including feeding of the lamination sheet S, separation of the lamination sheet S, insertion of the inner sheet P into the lamination sheet S, and joining of the lamination sheet S and the inner sheet P by heating and pressing can be automatically performed. Thus, convenience can be improved as compared with the configuration of the related art. However, a problem also occurs in the image forming apparatus 5 including the above-described laminator 3. A description is given of this problem below.

Figure 5:
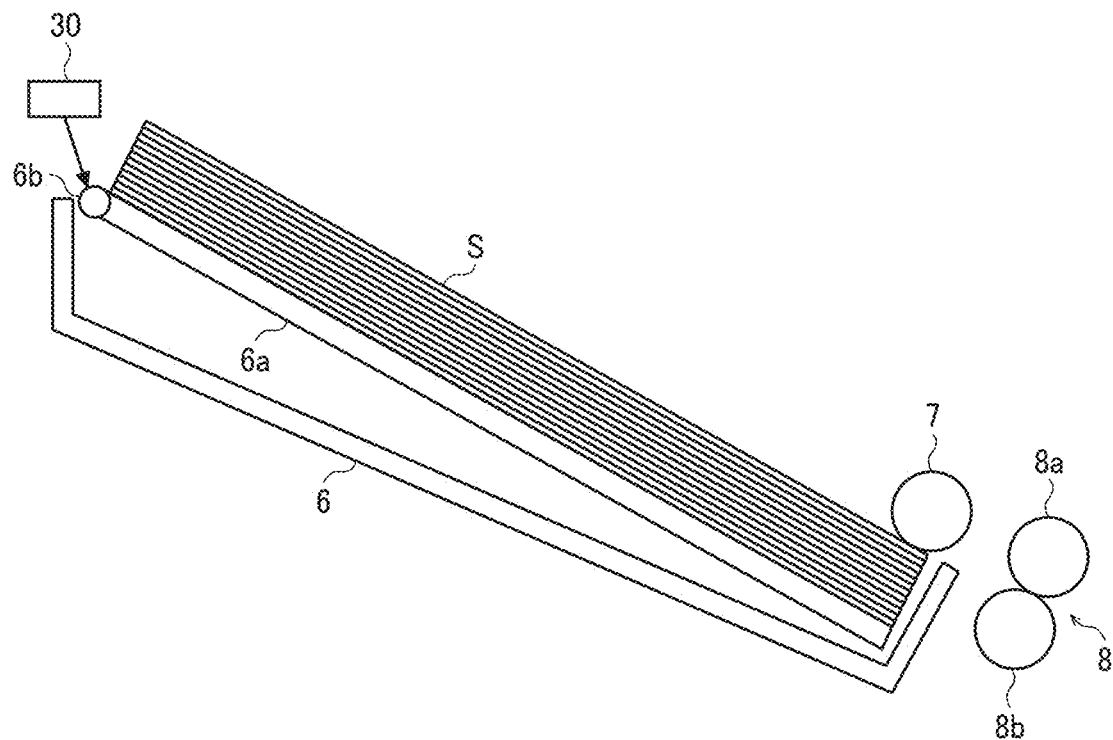
FIG. 5 is a schematic view of a sheet feed tray according to a comparative example.

FIG. 5 is a schematic view of the sheet feed tray 6. The lamination sheets S stacked in a bundle on the sheet tray 6a in the sheet feed tray 6 are held in a state where the leading end of the lamination sheets S in the sheet conveyance direction is pressed against the sheet feed roller 7 with a specified pressing force by the rotation of the sheet tray 6a with a base end 6b as a fulcrum which is the upstream end in the sheet conveyance direction. The sheet tray 6a is rotated by the lifter 30 including a driver such as a motor. Thus, the lamination sheets S on the sheet tray 6a are lifted and lowered. Next, the lamination sheet S is fed by the rotation of the sheet feed roller 7. At this time, the feed roller 8a also rotates in the same direction as the sheet feed roller 7, and the separate roller 8b also stops or rotates in the opposite direction so that only one lamination sheet S is separated and fed.

The separate roller 8b is provided with a torque limiter. In a case where a plurality of lamination sheets S are fed between the feed roller 8a and the separate roller 8b (separation nip), the friction force of the separate roller 8b restricts the conveyance of the lower lamination sheet S. Thus, only the uppermost lamination sheet S is fed. When the remaining amount of the sheet bundle decreases with the sheet feeding and the uppermost sheet face on the sheet tray 6a is lowered, the lowering of the sheet face is detected by a sensor. Thus, the lifter 30 rotates the sheet tray 6a counterclockwise in FIG. 5 with the base end 6b as a fulcrum. As a result, the uppermost sheet face of the lamination sheets S stacked on the sheet tray 6a is controlled to be lifted, and the uppermost lamination sheet S is controlled to be pressed against the sheet feed roller 7 with a specified pressing force.

Figure 6:
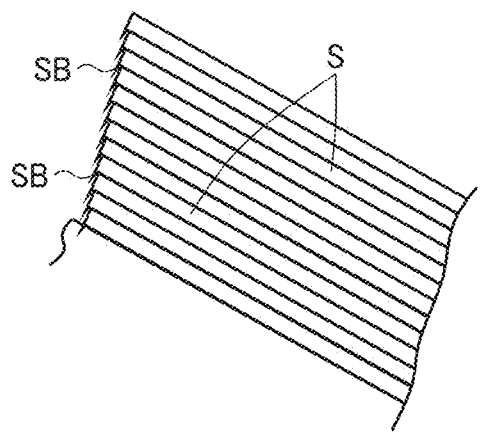
FIG. 6 is a schematic view of trailing ends of lamination sheets stacked on the sheet feed tray of FIG. 5.

FIG. 6 is an enlarged view of a trailing end of the lamination sheets S in the conveyance direction when the lamination sheets S are stacked on the sheet feed tray 6. As described above, since the lamination sheet S is formed with a resin material such as a polyester sheet, burrs SB may be formed at the trailing end of the lamination sheet S at the time of sheet formation. When the lamination sheet S having such burrs SB is fed, the downward burrs SB formed on the uppermost lamination sheet S are caught by the second lamination sheet S. Thus, the second lamination sheet S is fed together with the first lamination sheet S to cause the double feeding. When the force with which the lamination sheet S is caught by the burrs SB is larger than the separation force in the separation roller pair 8, the double feeding of the lamination sheet S occurs.

Figure 7:
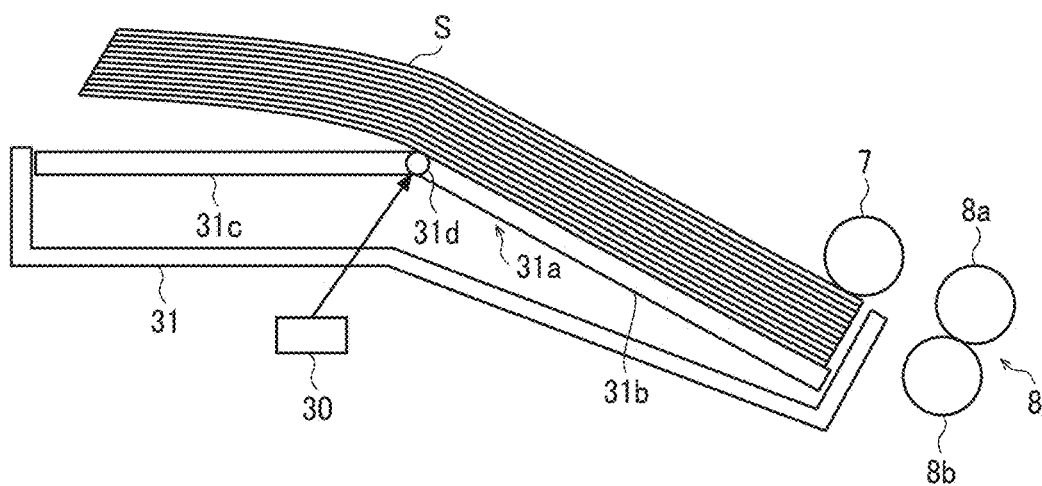
FIG. 7 is a schematic view of a sheet feed tray in which a loading surface is divided, according to another comparative example.
Figure 8:
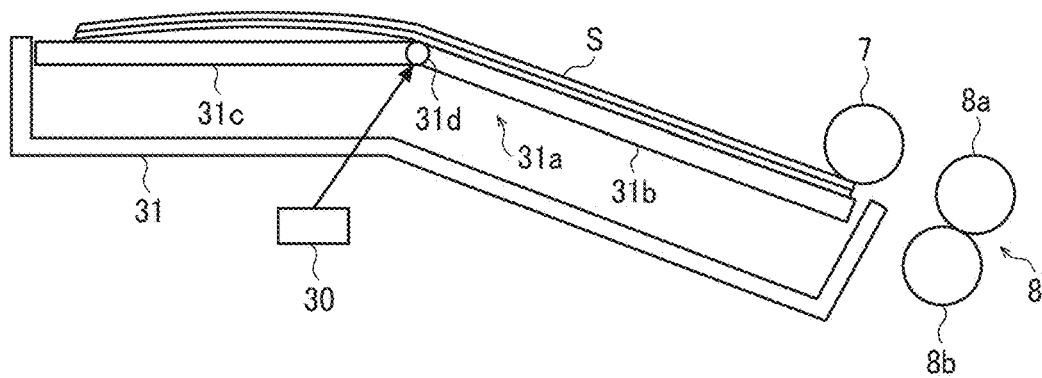
FIG. 8 is a diagram illustrating a state in which sheets are reduced in the sheet feed tray of FIG. 7 in which the loading surface is divided.
Figure 9:
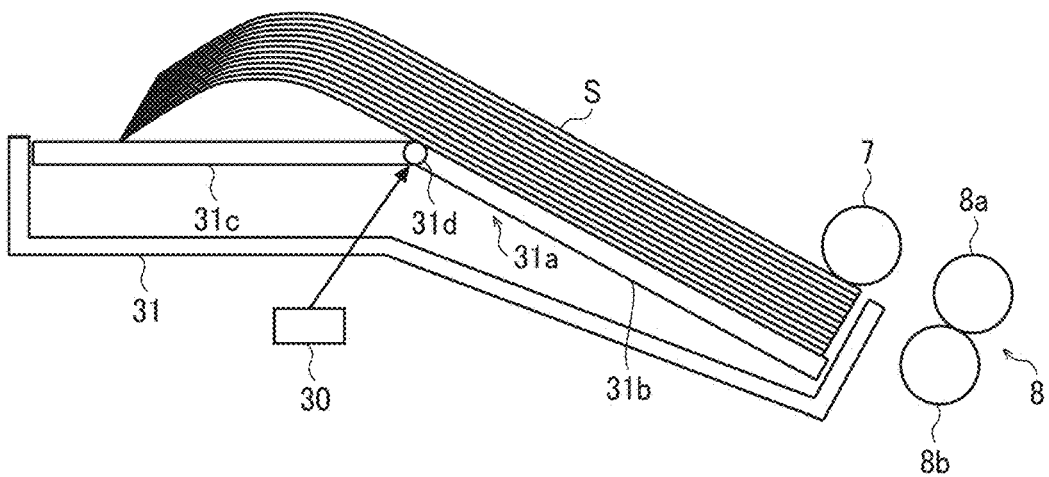
FIG. 9 is a diagram illustrating a state when an amount of deflection of the sheets are excessive in the sheet feed tray of FIG. 7 in which the loading surface is divided.

In the related art, a sheet feed tray may have a configuration in which the tray is divided into two stacking faces or a configuration in which a part of a bottom plate of the tray is lifted and lowered with respect to a feed roller in order to improve sheet separating property at the time of sheet feeding. FIGS. 7, 8 and 9 illustrate a sheet feed tray in which a loading surface is divided, according to a comparative example. In the comparative example, a sheet feed tray 31 includes a sheet tray 31*a* that is a sheet stacker divided into two portions on which lamination sheets S are stacked. The sheet tray 31*a* includes a first stacking face 31*b* and a second stacking face 31*c*. The second stacking face 31*c* is fixed to a tray body of the sheet feed tray 31 in a substantially horizontal state. The first stacking face 31*b* is rotatable around a base end 31*d* as a fulcrum. The lamination sheets S on the sheet tray 31*a* are stacked in a bundle state so that the center of gravity thereof is positioned above the first stacking face 31*b*. The first stacking face 31*b* rotates around the base end 31*d* as a fulcrum, so that the leading end of the lamination sheets S in the sheet conveyance direction is held in a state where the lamination sheets S are pressed against the sheet feed roller 7 with a specified pressing force. The first stacking face 31*b* is rotated by the lifter 30, and the lamination sheets S on the first stacking face 31*b* are lifted and lowered.

Thereafter, the sheet feed roller 7 and the separation roller pair 8 operate in the same manner as the sheet feed tray 6, and only one uppermost lamination sheet S is separated and fed. FIG. 7 illustrates a state where a large number of lamination sheets S are stacked on the sheet tray 31*a* in the sheet feed tray 31. FIG. 8 illustrates a state where the number of lamination sheets S on the sheet tray 31*a* is reduced and the lifter 30 is operated, so that the first stacking face 31*b* is lifted. In the state illustrated in FIG. 7, when burrs SB are formed at the trailing end of the lamination sheets S, the state is substantially the same as the state illustrated in FIG. 6. Thus, the double feeding of the lamination sheet S may occur. In the state illustrated in FIG. 8, the bending angle between the first stacking face 31*b* and the second stacking face 31*c* is larger than the bending angle in the state illustrated in FIG. 7. Thus, the trailing end of the lamination sheets S is less likely to droop and the burrs SB are likely to be caught. In the state illustrated in FIG. 9, a problem that the bending angle is too sharp with respect to the physical properties of the lamination sheets S, a sheet droop at the trailing end is significant, and the conveyance resistance increases to cause the double feeding or non-feeding. A description is given of a configuration of an embodiment of the present disclosure that prevents occurrence of the above-described problem.

Figure 10:
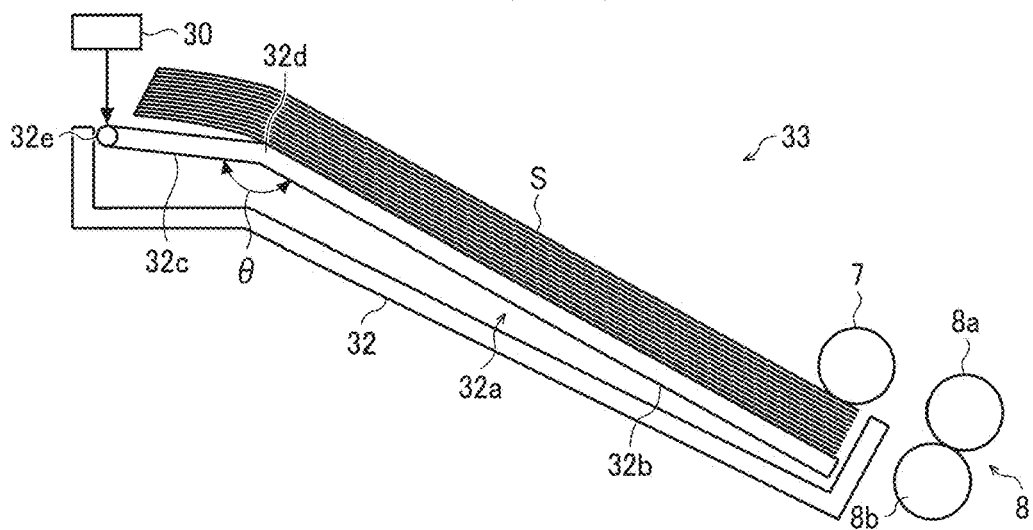
FIG. 10 is a schematic view of a sheet feed tray according to an embodiment of the present disclosure.

FIG. 10 illustrates a sheet feed tray according to an embodiment of the present disclosure. A sheet feed tray 32 is used instead of the sheet feed tray 6 used in FIGS. 1 and 2. The sheet feed tray 32 includes a sheet tray 32*a* serving as a sheet stacker that can be lifted and lowered and can stack lamination sheets S. The sheet tray 32*a* is lifted and lowered by the lifter 30 so that the uppermost lamination sheet S is pressed against the sheet feed roller 7 with a specified pressing force. The sheet tray 32*a* is divided into two parts and includes a first stacking face 32*b*, on which mainly the lamination sheets S are stacked, positioned on the downstream side in the sheet conveyance direction, and a second stacking face 32*c* positioned on the upstream side in the sheet conveyance direction. In the sheet tray 32*a*, the first stacking face 32*b* and the second stacking face 32*c* are connecting to each other by a bent portion 32*d* such that the first stacking face 32*b* and the second stacking face 32*c* form a specified angle, and the first stacking face 32*b* and the second stacking face 32*c* are integrated as one unit. The sheet tray 32*a* is rotatable around a base end 32*e* as a fulcrum positioned at an upstream end in the sheet conveyance direction.

The lamination sheets S on the sheet tray 32*a* are stacked in a bundle state so that the center of gravity thereof is positioned above the first stacking face 32*b*, and rotate around the base end 32*e* as a fulcrum. Accordingly, the leading end of the lamination sheets S in the sheet conveyance direction is held in a state where the lamination sheets S are pressed against the sheet feed roller 7 with a specified pressing force. The sheet tray 32*a* is rotated by the lifter 30, and the lamination sheets S on the first stacking face 32*b* are lifted. The first stacking face 32*b* extends to the upstream side in the sheet conveyance direction from the position of the center of gravity of the stacked lamination sheets S, and has main functions of holding the lamination sheets S and contacting the sheet feed roller 7. The bent portion 32*d* is formed at a position where the trailing end of the stacked lamination sheets S droops on the second stacking face 32*c*. The second stacking face 32*c* is formed so that the trailing end of the lamination sheet S does not droop too much on the upstream side of the bent portion 32*d* in the sheet conveyance direction.

The bending angle formed by the first stacking face 32*b* and the second stacking face 32*c* at the bending portion 32*d* is a specified angle $\theta$. The formation position of the bent portion 32*d* and the specified angle $\theta$ are determined by various conditions such as materials (physical properties), size, and thickness of lamination sheets S to be used, and are determined in such a manner that the trailing end of the sheet having the maximum or minimum size or the maximum or minimum thickness among the lamination sheets S to be used is elastically deformed as described below. If the bending angle is set to an acute angle more than necessary, similarly to the state illustrated in FIG. 9, the drooping amount at the trailing end is excessive, and the sheet conveyance property may be adversely affected. Thus, setting the bending angle within an appropriate range is desirable.

Figure 11:
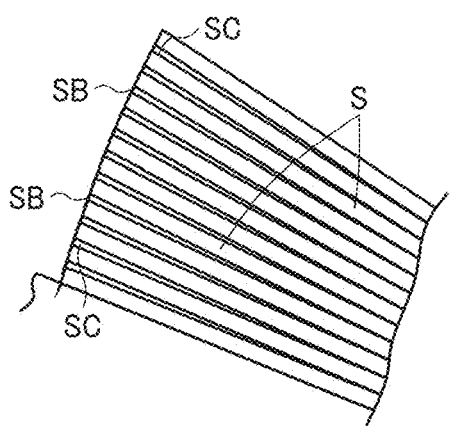
FIG. 11 is a schematic view of trailing ends of lamination sheets stacked on the sheet feed tray according to an embodiment of the present disclosure.

FIG. 11 is an enlarged view of a trailing end of lamination sheets S in the conveyance direction when the lamination sheets S are stacked on the sheet feed tray 32. In the configuration of the present embodiment, individual sheets droop downward due to the influence of gravity at the sheet trailing end on the upstream side of the bent portion 32*d* in the sheet conveyance direction. Thus, clearances SC are generated between the lamination sheets S. As described above, the clearances SC are formed between the lamination sheets S, so that burrs SB formed on the uppermost lamination sheet S are less likely to be caught by the lower lamination sheet S. Thus, the occurrence of the double feeding or non-feeding is restricted. As described above, the clearances SC are formed between the lamination sheets S in the example illustrated in FIG. 11. However, the above-described advantageous effect of preventing the occurrence of the double feeding or non-feeding can be achieved as long as the clearance SC is formed at least between the uppermost sheet and the sheet immediately below the uppermost sheet. At this time, when the uppermost sheet is fed and the sheet immediately below the uppermost sheet turns to the uppermost sheet, a new clearance SC is formed between the new uppermost sheet and the sheet immediately below the new uppermost sheet.

Figure 12:
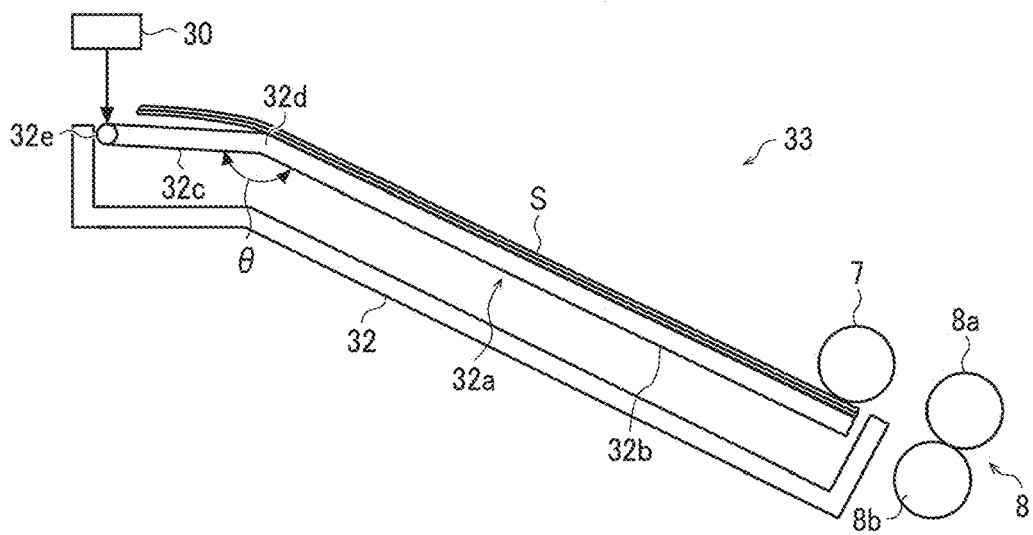
FIG. 12 is a diagram illustrating a state when sheets are reduced in the sheet feed tray according to an embodiment of the present disclosure.

FIG. 12 illustrates the sheet feed tray 32 in a state where the stacking amount of the lamination sheets S has decreased from the state illustrated in FIG. 10. When the stacking amount of the lamination sheets S decreases with the feeding of the stacked lamination sheets S, the lifter 30 is operated to rotate the sheet tray 32a around the base end 32e in the counterclockwise direction in FIG. 12. Thus, the contact position between the uppermost lamination sheet S and the sheet feed roller 7 is controlled to be maintained at a constant height. As described above, when the stacking amount of the lamination sheets S decreases, the sheet tray 32a is preferably lifted. The first stacking face 32b and the second stacking face 32c are integrally formed in the sheet tray 32a. The second stacking face 32c has the base end 32e as a rotation fulcrum in the vicinity of or adjacent to the upstream end of the second stacking face 32c in the conveyance direction. Among the above-described configurations, the sheet feed tray 32, the sheet feed roller 7, the separation roller pair 8, and the lifter 30 constitute at least part of a sheet feeder 33. As a result, the sheet tray 32a can be lifted and lowered in a state where the specified angle θ is maintained as a bending angle. The drooping state at the sheet trailing end can be kept constant without depending on the stacking amount of the lamination sheets S. Thus, the occurrence of the double feeding and non-feeding can be reduced.

In the above-described configuration, the first stacking face 32b is disposed to be inclined downward toward the downstream side in the sheet conveyance direction. As a result, the installation area of the apparatus can be reduced as compared with the case where the first stacking face 32b is disposed horizontally. The sheet feed roller 7 and the separation roller pair 8 are disposed in the tangential direction to the first stacking face 32b of the lamination sheets S stacked on the first stacking face 32b. Accordingly, the lamination sheets S are positioned on the downstream side in the conveyance direction by their own weight when the lamination sheets S are stacked on the first stacking face 32b. Thus, an end fence is not required and cost reduction can be achieved.

In the above-described embodiment, an example is described in which the laminator 3 of a vertical-conveyance-type is used as a laminator to which the present disclosure is applied. However, the present disclosure is applicable to a laminator of horizontal-conveyance-type. In the present embodiment, an example is also described in which the image forming apparatus 5 is used as an image forming apparatus to which the present disclosure is applied. However, the image forming apparatus is not limited thereto, and the present disclosure is applicable to, for example, a copier, a facsimile machine, or a multifunction peripheral (MFP). Further, in the above-described embodiment, an example is described in which a transfer sheet is used as an inner sheet P on which an image is formed. Examples of the transfer sheet include thick paper, a postcard, rolled paper, an envelope, plain paper, thin paper, coated paper, art paper, tracing paper, an overhead projector transparency (OHP sheet or OHP film), and a resin film, and any other sheet-shaped material on which an image can be formed may be used.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The invention claimed is:

1. A sheet feeder comprising:
   a sheet stacker on which sheets to be conveyed are stacked;
   a sheet feed roller configured to feed the sheets;
   a separation roller pair configured to separate the sheets fed by the sheet feed roller one by one; and
   a lifter configured to lift and lower the sheet stacker depending on a stack amount of the sheets,
   the sheet stacker including:
      a first stacking face opposite the sheet feed roller to support a downstream portion of the sheets in a conveyance direction;
      a second stacking face to support an upstream portion of the sheets in the conveyance direction; and
      a bent portion integrally connecting the first stacking face and the second stacking face such that the first stacking face and the second stacking face form a specified angle, the first stacking face having a longer length measured perpendicular to the bent portion than the second stacking face,
   the sheet stacker configured to stack the sheets such that a center of gravity of the sheets is positioned above the first stacking face, and
   the sheet stacker configured to integrally displace the first stacking face and the second stacking face when the lifter operates,
   wherein the bent portion includes a base end, and the first stacking portion is configured to rotate around the base end.

2. The sheet feeder according to claim 1,
   wherein the sheet stacker is configured to rotate around a fulcrum to displace when the lifter operates, and
   wherein the fulcrum is disposed adjacent to an upper end of the second stacking face in the conveyance direction.

3. The sheet feeder according to claim 1,
   wherein the first stacking face inclines downward toward a downstream side in the conveyance direction.

4. The sheet feeder according to claim 3,
   wherein the sheet feed roller and the separation roller pair are disposed in a tangential direction to the first stacking face of the sheets stacked on the first stacking face.

5. A laminator comprising the sheet feeder according to claim 1.

6. An image forming apparatus comprising the laminator according to claim 5.

7. An image forming apparatus comprising the sheet feeder according to claim 1.

8. An image forming system comprising the sheet feeder according to claim 1.

* * * * *